United States Patent
Sinnott, Jr.

(10) Patent No.: US 7,085,754 B2
(45) Date of Patent: Aug. 1, 2006

(54) SYSTEM AND A TWO-PASS ALGORITHM FOR DETERMINING THE OPTIMUM ACCESS PATH FOR MULTI-TABLE SQL QUERIES

(75) Inventor: Joseph F. Sinnott, Jr., Palo Alto, CA (US)

(73) Assignee: International Business Machines Corporation, Armonk, NY (US)

(*) Notice: Subject to any disclaimer, the term of this patent is extended or adjusted under 35 U.S.C. 154(b) by 544 days.

(21) Appl. No.: 10/090,275

(22) Filed: Mar. 4, 2002

(65) Prior Publication Data
US 2003/0167272 A1 Sep. 4, 2003

(51) Int. Cl.
G06F 17/30 (2006.01)

(52) U.S. Cl. .......................................................... 707/2
(58) Field of Classification Search .................. 707/1–6
See application file for complete search history.

(56) References Cited

U.S. PATENT DOCUMENTS

| | | | | |
|---|---|---|---|---|
| 5,345,585 A | * | 9/1994 | Iyer et al. | 707/2 |
| 5,600,829 A | * | 2/1997 | Tsatalos et al. | 707/2 |
| 5,671,403 A | * | 9/1997 | Shekita et al. | 707/3 |
| 6,138,111 A | * | 10/2000 | Krishna | 707/2 |
| 6,370,522 B1 | * | 4/2002 | Agarwal et al. | 707/2 |
| 6,377,943 B1 | * | 4/2002 | Jakobsson | 707/2 |
| 6,397,204 B1 | * | 5/2002 | Liu et al. | 707/2 |
| 6,421,657 B1 | * | 7/2002 | Sinnott, Jr. | 707/2 |
| 6,516,310 B1 | * | 2/2003 | Paulley | 707/2 |
| 6,643,636 B1 | * | 11/2003 | Au et al. | 707/2 |

OTHER PUBLICATIONS

Arun Swami et al , Optimization of Large Join Queries, ACM 1988, pp. 8-17.*
Microsoft press computer dictionary, 1997, p. 437.*

* cited by examiner

*Primary Examiner*—Debbie M. Le
(74) *Attorney, Agent, or Firm*—Sandra M. Parker, Esq.

(57) ABSTRACT

An apparatus, article of manufacture and computer-based method is provided for determining the optimum join sequence for processing a query having a plurality of tables from a relational database stored in an electronic storage device having a database management system. The method is performed in two passes. The first pass is used for determining an optimum join sequence for joining the plurality of tables from the query. The second pass uses the optimum join sequence for creating a lowest cost access path plan for processing the query. The first pass performs successive steps until creation of a simulated composite table having all tables from the query, wherein each step creates a set of miniplans for simulating all possible joins of a predetermined subset of the query tables and uses a cost model calculations for estimating and saving the least expensive join from this set of joins.

18 Claims, 3 Drawing Sheets

SYSTEM AND A TWO-PASS ALGORITHM FOR DETERMINING THE OPTIMUM ACCESS PATH FOR MULTI-TABLE SQL QUERIES

BACKGROUND OF THE INVENTION

1. Field of the Invention

This invention relates in general to database management systems performed by computers, and in particular to a system and method for determining the optimum join sequence and a lowest cost access path plan used in processing a multi-table SQL query in a relational database.

2. Description of Related Art

Databases are computerized information storage and retrieval systems. A Relational Database Management System (RDBMS) is a database management system (DBMS) which uses relational techniques for storing and retrieving data. RDBMS software using a Structured Query Language (SQL) interface is well known in the art. The SQL interface has evolved into a standard language for RDBMS software and has been adopted as such by both the American National Standards Organization (ANSI) and the International Standards Organization (ISO).

Algorithms used to determine the optimum join sequence for relational database queries which involve multiple tables can be very expensive in terms of CPU and storage use. One such algorithm, known as the Dynamic Programming Algorithm, can increase such usage proportional to 2**N, where N is the number of tables in the query. Therefore, it is very important that such algorithms be very efficient in their use of resources.

In the conventional Dynamic Programming Algorithm the goal of the algorithm used in processing a multi-table SQL query is to determine the complete detailed access path plan and to provide a great amount of supporting data, usually recorded in EXPLAIN tables. This is very expensive.

Therefore, there is a need for a simple and optimized method and system able to solve the CPU time and storage usage expense problem by determining the optimum join sequence for relational database multi-tables queries.

SUMMARY OF THE INVENTION

The foregoing and other objects, features, and advantages of the present invention will be apparent from the following detailed description of the preferred embodiments, which makes reference to several drawing figures.

One preferred embodiment of the present invention is a computer-based method for determining the optimum join sequence for processing a query having a plurality of tables from a relational database stored in an electronic storage device having a database management system. The method is performed in two passes. The first pass is used for determining an optimum join sequence for joining the plurality of tables from the query. The second pass uses the optimum join sequence for creating a lowest cost access path plan for processing the multi-table query. The first pass performs successive steps until creation of a simulated composite table having all tables from the query, wherein each step creates a set of miniplans for simulating all possible joins of a predetermined subset of the query tables and uses a cost model calculations for estimating and saving the least expensive join from this set of joins.

Another preferred embodiment of the present invention is a system implementing the above-mentioned method embodiment of the present invention.

Yet another preferred embodiment of the present invention includes a computer usable medium tangibly embodying a program of instructions executable by the computer to perform method steps of the above-mentioned method embodiment of the present invention.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description of the preferred embodiments reference is made to the accompanying drawings, which form the part thereof, and in which are shown by way of illustration specific embodiments in which the invention may be practiced. It is to be understood that other embodiments may be utilized and structural and functional changes may be made without departing from the scope of the present invention.

As mentioned above, in the prior art the goal of the one-pass Dynamic Programming Algorithm used in processing a multi-table SQL query is to determine the complete detailed access path plan and to provide a great amount of supporting data, usually recorded in EXPLAIN tables.

The present invention discloses a system, method and a computer usable medium embodying a program of instructions executable by a computer to perform the method of the present invention for solving the CPU time and storage use expense problem of the prior art. It determines the optimum join sequence for relational database multi-tables queries by executing the Dynamic Programming Algorithm in two steps (passes), and is named a two-pass Dynamic Programming Algorithm.

Therefore, in the present invention the goal of the first pass is only to determine the best join sequence for joining the N tables in the query. It is the goal of the second pass to make use of this optimum join sequence to determine the detailed access path plan and the supporting data for processing the multi-table query.

Figure 1:
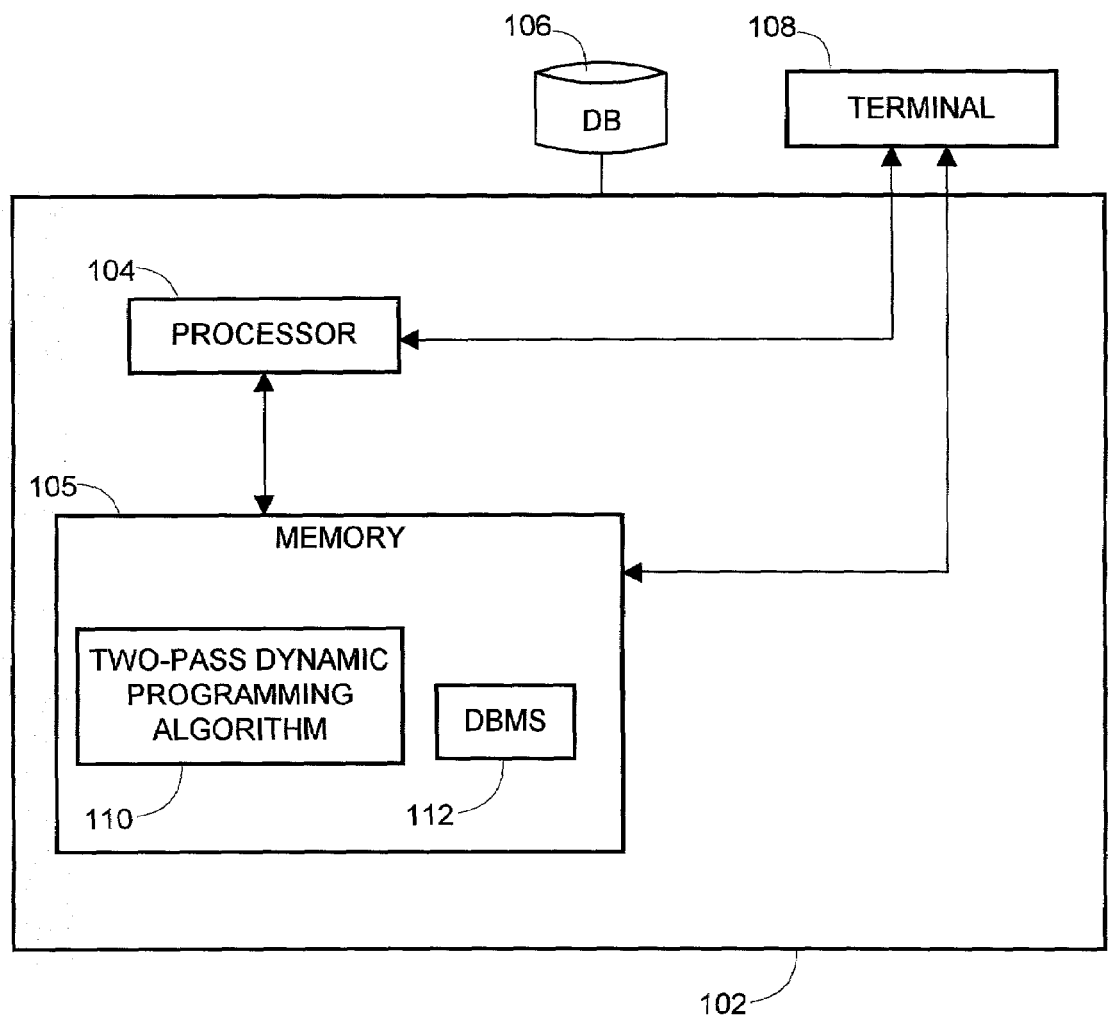
FIG. 1 illustrates a computer hardware and software environment enabling the two-pass Dynamic Programming Algorithm, according to the preferred embodiments of the present invention.

FIG. 1 illustrates an exemplary computer hardware and software environment usable by the preferred embodiments of the present invention, including a computer system 102 having one or more conventional processors 104 executing instructions stored in an associated computer memory 105, and having a computer system terminal 108. The operating memory 105 can be loaded with instructions received through an optional storage drive or through an interface with a computer network.

The processor 104 is connected to one or more electronic storage devices 106, such as disk drives, that store one or more relational databases. They may comprise, for example, optical disk drives, magnetic tapes and/or semiconductor memory. Each storage device permits receipt of a computer usable medium, such as a magnetic media diskette, magnetic tape, optical disk, semiconductor memory and other machine-readable storage device, and allows for method program steps recorded on the computer usable medium be read and transferred into the computer memory. The recorded program instructions may include the code for the method embodiment of the present invention. Alternatively, the program steps can be received into the operating memory from a computer over the network.

Operators of the computer system terminal 108 use a standard operator terminal interface (not shown), such as IMS/DB/DC, CICS, TSO, OS/2 or other similar interface, to transmit electrical signals to and from the computer system 102, that represent commands for performing various tasks, such as search and retrieval functions, termed queries, against the databases stored on the electronic storage device 106. In the present invention, these queries conform to the Structured Query Language (SQL) standard, and invoke functions performed by a DataBase Management System (DBMS) 112 located at the computer system 102, such as a Relational DataBase Management System (RDBMS) software. In the preferred embodiments of the present invention, the RDBMS software is the DB2 product, offered by IBM for the AS400, OS390 or OS/2 operating systems, the Microsoft Windows operating systems, or any of the UNIX-based operating systems supported by the DB2. Those skilled in the art will recognize, however, that the present invention has application to any RDBMS software that uses SQL, and may similarly be applied to non-SQL queries and probably even to non-relational databases.

Figure 2:
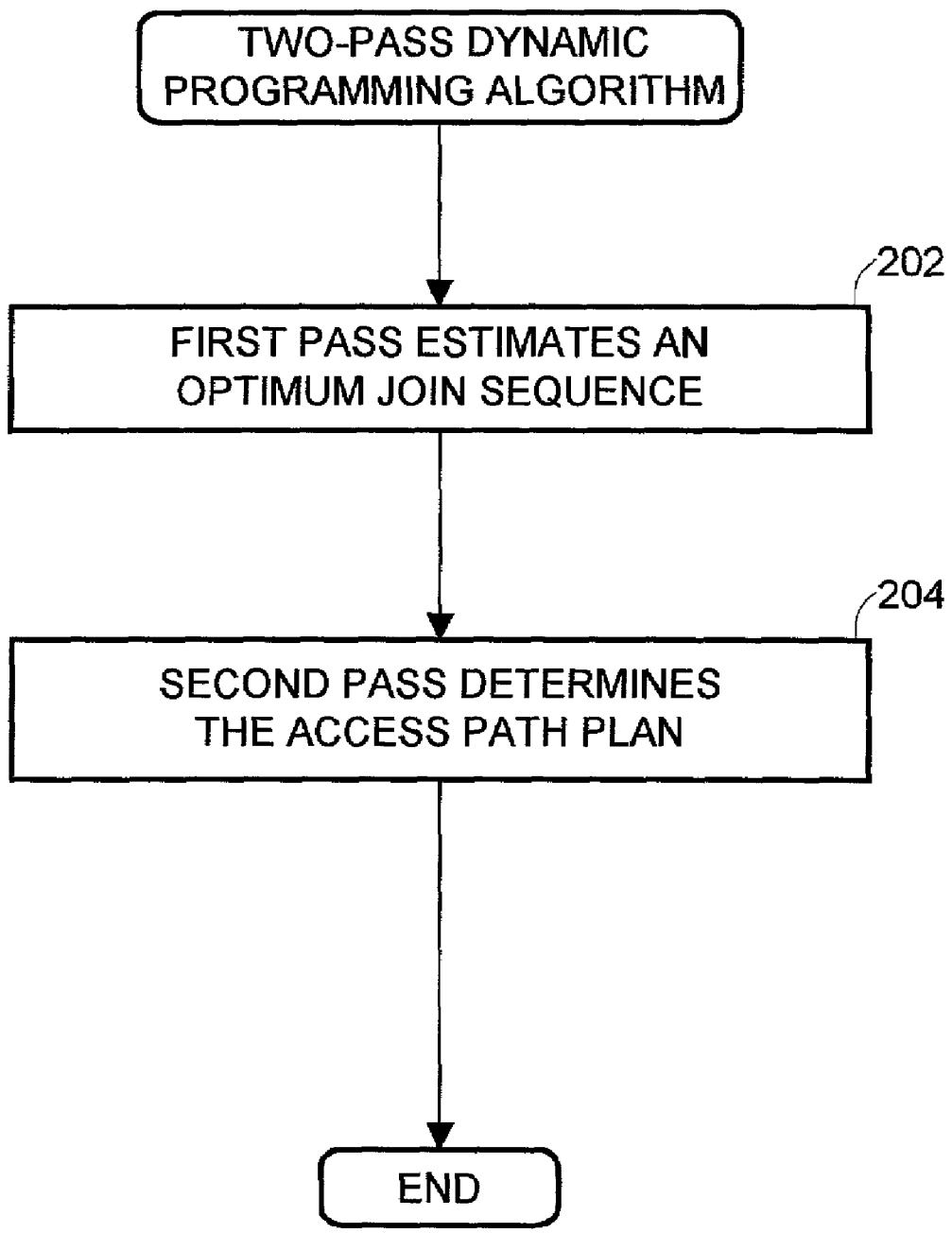
FIG. 2 illustrates a flowchart of the two-pass Dynamic Programming Algorithm, according to the preferred embodiments of the present invention.

FIG. 1 further illustrates a software environment enabling preferred embodiments of the present invention. In the system shown in FIG. 1 the computer system 102 further includes the two-pass Dynamic Programming Algorithm 110 software of the present invention. As mentioned above, the two-pass Dynamic Programming Algorithm 110 software is the computer-based method used for determining the optimum join sequence and the least cost access path for a relational database multi-tables query by performing the Dynamic Programming Algorithm in two passes 202 and 204, as illustrated in FIG. 2. The goal of the first pass 202 is only to estimate the optimum join sequence for joining the tables in the query. It is the goal of the second pass 204 to use this optimum join sequence to determine the detailed access path plan and the supporting data for the multi-table query execution.

The two-pass Dynamic Programming Algorithm 110 simulates the construction of composite tables at each step. Each composite table, except for the final one, contains a subset of the N tables. The final composite table contains all N tables. The strategy used to add a table to a composite table to create a second composite table which has one more table in it is represented internally by a control structure called a miniplan. Therefore, a miniplan represents each step of a generated access path plan. The miniplan contains information such as: which index to use, which join method to use, and whether or not any sorting of the one of composite tables or the new table is required as a part of the process. It also contains some supporting data.

In the algorithm of the present invention a cost model is used to estimate the cost of each step of the algorithm so that alternatives can be compared. The cost is calculated in terms of CPU instructions time and I/O counts required to add a new table to a given composite table. The two-pass algorithm allows partial results of the cost model calculations to be saved for a given table and index, during the first pass, and used in subsequent calculations. This results in significant savings in CPU time. Further, each composite table is represented internally by a control structure called a Cost structure. The Cost structure contains information such as which tables are in the composite table, the cost of building the composite table and the various row orderings that might be possible.

The two-pass algorithm of the present invention was implemented as a part of the Dynamic Programming Algorithm of DB2 z/OS Version 7 product. Some preferred embodiments of the present invention in the first pass of the algorithm use miniplan prototypes to avoid saving all information used by the algorithm in the miniplans, which is redundant. Moreover, in these preferred embodiments, the first pass saves partial results and retrieves them as similar situations are encountered when the algorithm proceeds. Miniplan prototypes and saving/restoring partial results are the options available in DB2 z/OS Version 8 product.

Figure 3:
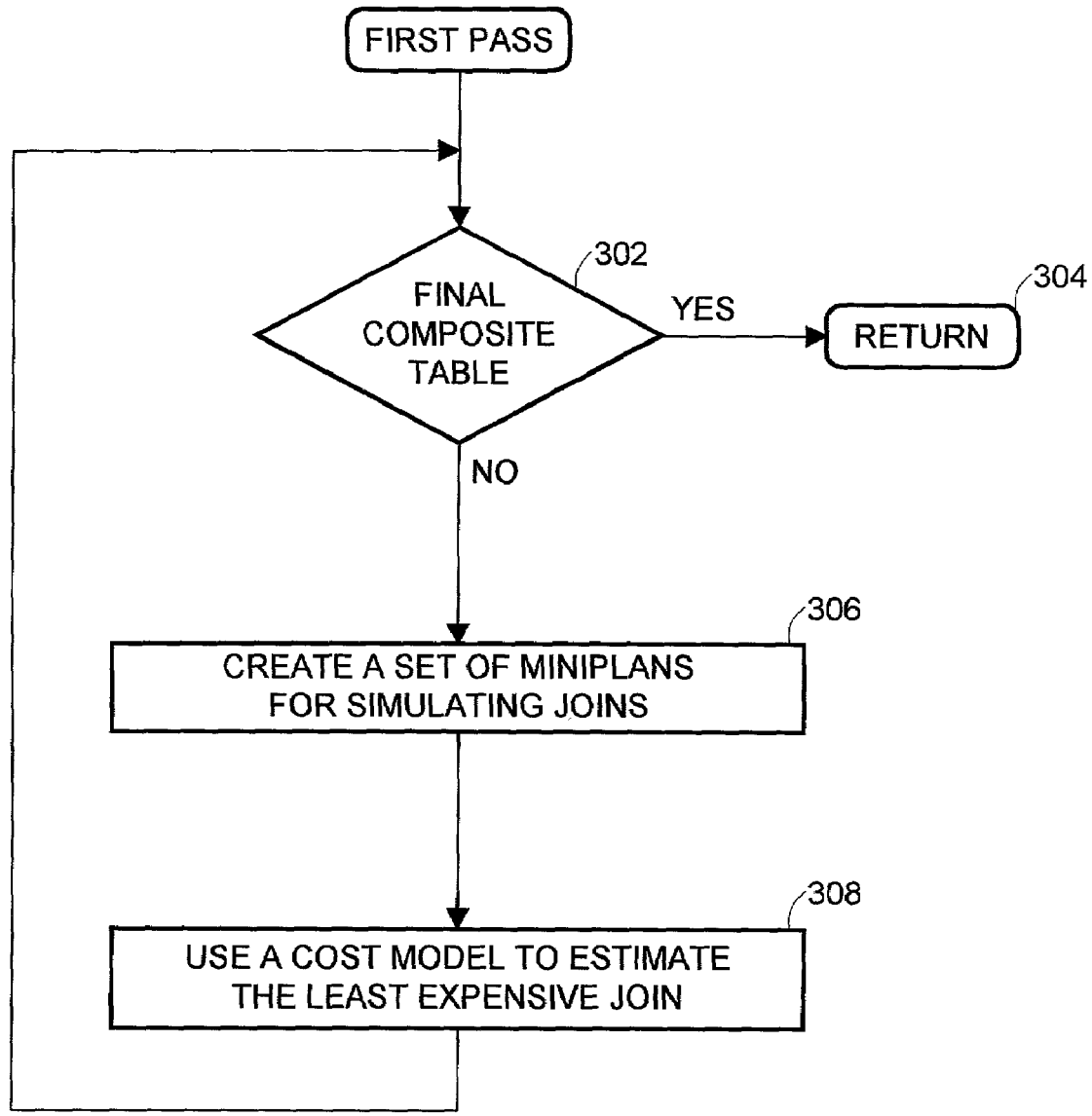
FIG. 3 illustrates a flowchart of the first pass of the Dynamic Programming Algorithm, according to the preferred embodiments of the present invention.

The first pass 202 of the two-pass Dynamic Programming Algorithm 110 of the present invention proceeds as follows in FIG. 3. The first pass performs following successive steps until a creation of a final simulated composite table having all tables from the query is detected in step 302, when the routine returns in step 304. Otherwise, each step 306 creates a set of miniplans for simulating all possible joins of a predetermined subset of the query tables, and each step 308 uses cost model calculations for estimating and saving the least expensive join from the set of joins, thereby determining the optimum join sequence.

In more detail, step one of step 306, for each of the N tables from the query, simulates the construction of a one-table composite table. The access path plan chosen to do this makes use of local predicates and any indexes that are available and can be used. For each created composite table Cost and needed miniplan structures are built and filled in.

Step two of step 306, for each of the simulated one-table composite tables created in step one, determines whether the number of rows in any of these tables is exactly one or less. If there are any of these tables, this step simulates the joining of all of them together. For example, if there are 3 one-row, one-table composite tables, the algorithm simulates the building of a 3-table composite table. This is done to reduce the cost because the joining is performed at the beginning of the join sequence. For each created composite table Cost structure and needed miniplan structures are built and filled in.

Step three of step 306 tests whether a simulated one-row composite table was built in step two above. If so, the algorithm simulates the joining of the tables not in the one-row composite table to the one-row composite table in turn, to create a new set of composite tables. In the previous example, each composite table in this new set of composite tables will have 4 tables in it and there will be N-3 of them. For each created composite table Cost structure and needed miniplan structures are built and filled in.

Step four of step 306 of the algorithm proceeds as follows. Given a set of composite tables with T tables in each T-composite table, the algorithm simulates the construction of composite tables with T+1 tables in each. This is performed by simulating the addition of a new table to a T-composite table to form a T+1-composite table. The new table must not already be in the T-composite table and may have to satisfy other constraints in order to be eligible for joining. For each new simulated T+1-composite table, a Cost structure and needed miniplan structures are built and filled in. Since there can be alternative ways to build a particular T+1-composite table, only the least expensive way is saved and the more expensive ways are discarded.

The process of the algorithm of the present invention continues until the construction of the final N-composite table is simulated, which indicates the end of the first pass. In the second pass the only output from the first pass, namely the optimum sequence in which the tables are joined in the N-composite table, is input in the algorithm. The second pass makes use of this optimum join sequence of the simulated N-composite table to determine the detailed access path plan and the supporting data of the query plan. Therefore, the construction of the composite tables is simulated in the optimum join sequence.

Steps one to three of the second pass are identical to these steps in the first pass. Namely, step one of the second pass, for each of the N tables from the query, simulates the construction of a one-table composite table. The access path plan chosen to do this makes use of local predicates, and any indexes that are available and can be used. For each created composite table Cost and needed miniplan structures are built and filled in.

Step two of the second pass, for each of the simulated one-table composite tables created in step one, determines whether the number of rows in any of these tables is exactly one or less. If there are any of these tables, this step simulates the joining of all of them together. For each created composite table Cost and needed miniplan structures are built and filled in.

Step three of the second pass tests whether a simulated one-row composite table was built in step two above. If so, the algorithm simulates the joining of the tables not in the one-row composite table to the one-row composite table in turn, to create a new set of composite tables. For each created composite table Cost and needed miniplan structures are built and filled in.

In step four of the second pass the next table in the join sequence is known, so the building of only one T+1-composite table is simulated, namely the composite table which results from adding the next table in the join sequence to the T-composite table. It determines the detailed access path plan and the supporting data of the query, used to describe how the system should process the query to obtain the result set. The created Cost and miniplan structures contain all of the information needed by any following steps in the BIND or execution processes.

In the second pass, although there is a great amount of supporting data created in the EXPLAIN tables, the number of Cost structures and miniplans is small. The number of Cost structures is equal to two times the number of tables in the query. The size of each miniplan is large, in order to hold the above plan and EXPLAIN tables information. Because each miniplan is unique, no attempt is made to generate miniplan prototypes, there is no saving of partial results and there is no Cost structure reuse.

In the two-pass Dynamic Programming Algorithm 110 of the present invention the only information needed to be saved during the first pass is information which supports the determination of the optimum join sequence. In the first pass there is no need to save any of the supporting data used in the prior art for the EXPLAIN tables or most of the information detailing which indexes are used. In the preferred embodiments of the present invention, by breaking the algorithm into two passes significant reductions in CPU time and storage use have been achieved. For example, the storage space used for one 15-table query dropped from approximately 94 MB to approximately 3 MB by implementing this approach.

In the prior art every candidate miniplan was saved as a possible final solution. Each saved miniplan requires in excess of 1000 bytes and in complex queries there can be tens of thousands of these miniplans. In some preferred embodiments of the two-pass algorithm of the present invention, however, only some miniplan prototypes needed to support the first pass algorithm are saved. The storage required for each of these saved miniplan prototypes is 22 bytes, because each miniplan in the present invention does not have to hold the whole miniplan and EXPLAIN table supporting information. Therefore, the information which in the prior art needed to be saved tens of thousands of times is reduced to 8 bytes, 4 bytes of which address the one applicable miniplan prototype.

Further, in the prior art a Cost structure was used for each composite table, and there were thousands of them for a complex query. Because in the two-pass process of the present invention many of these structures are not needed after the first few steps of the algorithm, they are reused which further reduces the amount of storage space required.

Moreover, at each step of the algorithm a cost model is invoked to estimate the cost in CPU and I/O resources required to add a new table to a given composite table. For each given table there are many calculations in the cost model which are repetitive. The two-pass algorithm allows only partial results of these calculations to be saved for a given table and index during the first pass, and they are used in subsequent calculations. This results in significant savings in CPU time and I/O resources.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-based method for determining the optimum join sequence for processing a query having a plurality of tables from a relational database stored in an electronic storage device having a database management system, the method comprising the steps of:
   (a) a first pass using simulation, miniplans and composite tables for determining an optimum join sequence for joining the plurality of tables from the query; and
   (b) a second pass for using the optimum join sequence for creating a lowest cost access path plan for processing the query.

2. The method according to claim 1, wherein the first pass performing successive steps until creation of a simulated composite table having all tables from the query, wherein each said step:
   creating a set of miniplans for simulating all possible joins of a predetermined subset of the query tables; and
   using a cost model calculations for estimating and saving the least expensive join from said set of joins, thereby determining the optimum join sequence.

3. The method according to claim 2, wherein the first pass for each said miniplan storing a used table index, join method, and sorting data, and for each said least expensive join storing names of joined tables, join cost and possible row orderings.

4. The method according to claim 3, wherein the first pass only storing non-redundant miniplan data, and saving partial results of the cost model calculations for future reuse.

5. The method according to claim 1, wherein the second pass performing successive steps until creation of a simulated composite table having all tables from the query, wherein each said step being performed in the optimum join sequence.

6. The method according to claim 1, wherein the query being a SQL query.

7. A computer-based processor system for determining the optimum join sequence for processing a query having a plurality of tables from a relational database stored in an electronic storage device having a database management system, the system comprising:

means for performing a first pass using simulation, miniplans and composite tables for determining an optimum join sequence for joining the plurality of tables from the query; and means for performing a second pass for using the optimum join sequence for creating a lowest cost access path plan for processing the query.

8. The system according to claim 7, wherein the first pass means performing successive steps until creation of a simulated composite table having all tables from the query, wherein each said step:

creating a set of miniplans for simulating all possible joins of a predetermined subset of the query tables; and using a cost model calculations for estimating and saving the least expensive join from said set of joins, thereby determining the optimum join sequence.

9. The system according to claim 8, wherein the first pass means for each said miniplan storing a used table index, join method, and sorting data, and for each said least expensive join storing names of joined tables, join cost and possible row orderings.

10. The system according to claim 9, wherein the first pass means only storing non-redundant miniplan data, and saving partial results of the cost model calculations for future reuse.

11. The system according to claim 7, wherein the second pass means performing successive steps until creation of a simulated composite table having all tables from the query, wherein each said step being performed in the optimum join sequence.

12. The system according to claim 7, wherein the query being a SQL query.

13. A computer usable medium tangibly embodying a program of instructions executable by the computer to perform a computer-based method for determining the optimum join sequence for processing a query having a plurality of tables from a relational database stored in an electronic storage device having a database management system, the method comprising the steps of:

(a) a first pass using simulation, miniplans and composite tables for determining an optimum join sequence for joining the plurality of tables from the query; and (b) a second pass for using the optimum join sequence for creating a lowest cost access path plan for processing the query.

14. The method according to claim 13, wherein the first pass performing successive steps until creation of a simulated composite table having all tables from the query, wherein each said step:

creating a set of miniplans for simulating all possible joins of a predetermined subset of the query tables; and using a cost model calculations for estimating and saving the least expensive join from said set of joins, thereby determining the optimum join sequence.

15. The method according to claim 14, wherein the first pass for each said miniplan storing a used table index, join method, and sorting data, and for each said least expensive join storing names of joined tables, join cost and possible row orderings.

16. The method according to claim 15, wherein the first pass only storing non-redundant miniplan data, and saving partial results of the cost model calculations for future reuse.

17. The method according to claim 13, wherein the second pass performing successive steps until creation of a simulated composite table having all tables from the query, wherein each said step being performed in the optimum join sequence.

18. The method according to claim 13, wherein the query being a SQL query.

* * * * *